Nov. 25, 1941.    J. H. WILSON    2,263,961
COOLING SYSTEM
Filed Nov. 22, 1939
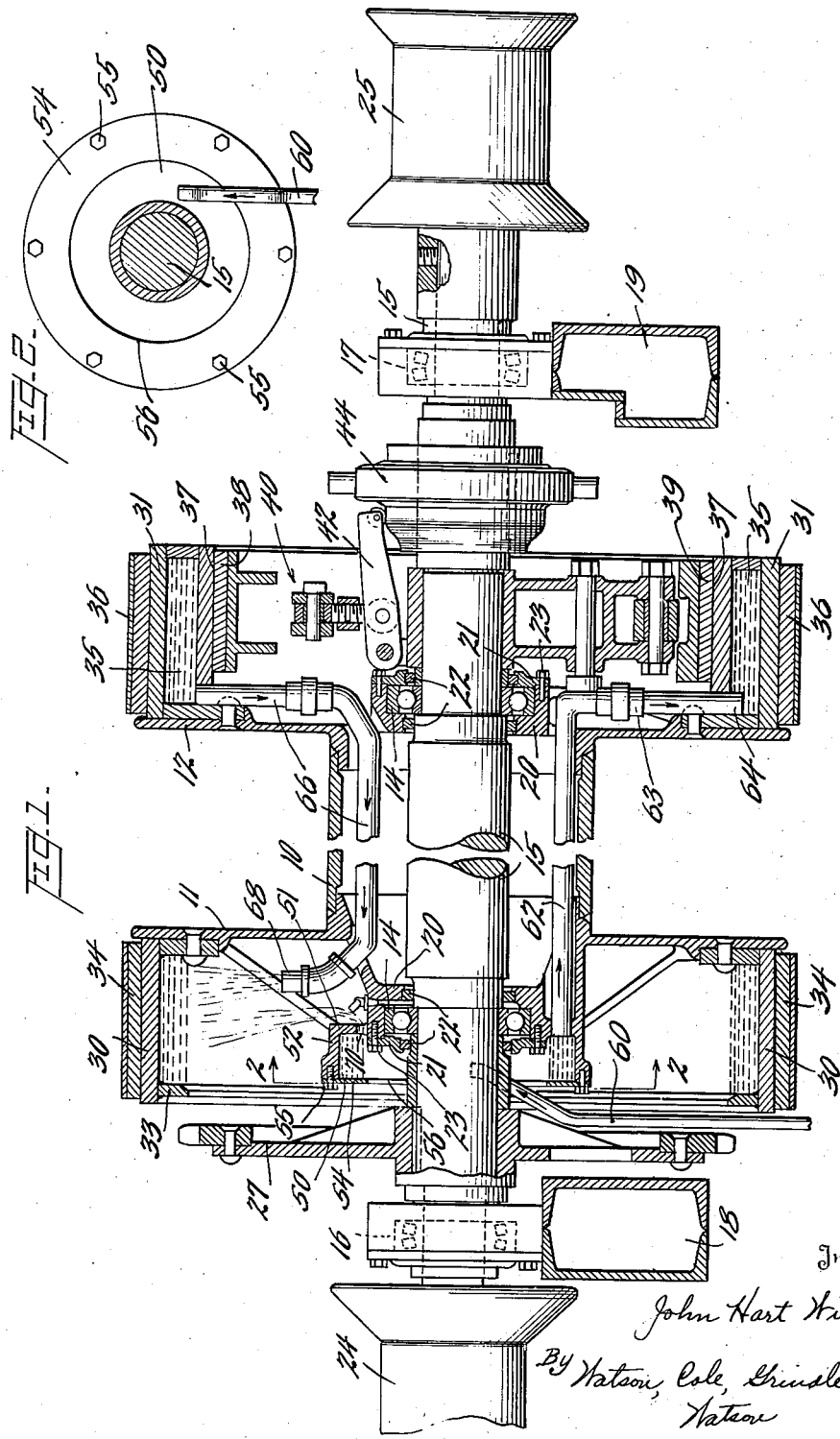
Inventor
John Hart Wilson
By Watson, Cole, Grindle & Watson
Attorney Patented Nov. 25, 1941

2,263,961

UNITED STATES PATENT OFFICE 2,263,961

COOLING SYSTEM

John Hart Wilson, Wichita Falls, Tex.

Application November 22, 1939, Serial No. 305,748

10 Claims. (Cl. 188—264)

This invention relates to cooling heat generating surfaces and more particularly to methods and apparatus for cooling braking surfaces such as those associated with the brake and clutch mechanisms used in connection with machines employed in the transmission of great forces or the handling of heavy loads, such as, for example, machines commonly designated as "draw works" and used in the oil fields.

The general object object of the invention is to provide novel and improved cooling arrangements of this character which may be applied to many types of draw works or similar machinery, but which are especially adapted to the double cathead top drum assembly of the winch, spudder, or the like, illustrated herein.

Another object of the invention is the provision of cooling means for machines of the character described which will enhance the convenience and safety of operation and control of the machine by the operator at his post adjacent one side thereof.

It has been proposed heretofore to cool the flanged brake and clutch rings of some of the simpler or more elementary machines of this type by directing a stream of water upon the inner surfaces of these rings, where it is held to some extent by the centrifugal force of the rotating ring. So far as the mere cooling of the brake surface is concerned, this spray or splash system is fairly satisfactory, but serious objections to its exclusive use arise by reason of other factors. First, there is always the danger of a certain amount of overflow and spillage even during the actual running of a drum, and when the drum stops all of the water in the upper portions of the brake rings falls down and splashes out. Also, very frequently, clouds of steam issue from the ring and obscure the operator's vision. A further objection to this type of cooling is that it substantially precludes the use of a friction clutch within the brake ring since the water would spill on the clutch band when the drum stopped, and the clutch would fail to hold.

Certain other proposals which have been made involve the use of closed cooling jackets or chambers in connection with both brake rings and a system of conduits leading to them from one or more sources of cooling fluid. Besides entailing a more expensive construction, such an arrangement generally requires boring the drum shaft and providing stuffing boxes at one or both ends thereof, thus not only tending to weaken the shaft, but also precluding the use of catheads at both ends of the shaft, this latter provision being very desirable in such machines, especially in connection with the top drums.

The present invention therefore contemplates, in its preferred form, the provision of a combined jacket and splash or spray cooling system for the drum assembly of a winch, spudder or similar machine, the cooling jacket or chamber being employed in connection with the brake ring on the operator's side of the machine, which ring is also equipped with an internal clutch assembly. The flanged brake ring on the opposite side from the operator is for braking purposes only and is preferably cooled by discharging fluid upon its inner surface from the jacket of the other ring, and also from the common source of supply for the system.

An important detail provided by the present invention is the centrifugal distributing chamber preferably installed within the brake ring which is not provided with the clutch or with the closed cooling chamber, this distributing chamber being provided with outlet passageways at different radial levels for the differential discharge of fluid to the circulating system for the opposite ring and directly to the inner surface of the adjacent ring.

Other objects and features of novelty will be apparent from the following specification when read in connection with the accompanying drawing in which one embodiment of the invention is illustrated by way of example.

In the drawing,

Figure 1 is an axial section through a drum assembly in which the novel cooling system is employed; and Figure 2 is a transverse sectional view taken on line 2—2 of Figure 1.

In the illustrated embodiment the reference numeral 10 indicates the cylindrical winding drum, which so far as the general aspect of the invention is concerned may be of any type and adaptable for any purpose, but which is illustrated in the drawing as the top drum of a winch or spudder employed in connection with operations incident to the drilling of oil wells. The drum 10 is provided with end plates or flanges 11 and 12 and is rotatably mounted as by means of the ball bearing assemblies 14 upon the horizontal shaft 15 which is in turn anti-frictionally mounted in the roller bearing assemblies 16 and 17 supported upon the side frame members 18 and 19 respectively. At each end of the drum 10 adjacent the bearing assemblies 14 are provided the enveloping flanges 20 and 21, each of which is provided with packing rings 22 for sealing off the bearing assemblies. The flanges 20 are shown as being formed integrally with the end plates or discs 11 or 12 of the drum, and the flanges 21 in this embodiment are provided by annular plates which are secured in position as by means of the screws 23. Similar sealing rings and packings may be provided for the shaft supporting bearings 16. Secured upon each end of the shaft 15 are the catheads 24 and 25, and keyed to the shaft adjacent one of the bearing supports is the sprocket wheel 27 through which the shaft is adapted to be driven.

Extending outwardly from the end plates 11 and 12 of the drum, and adjacent the peripheries thereof, are the cylindrical brake rings 30 and 31. The brake ring 30 upon the left hand side of the machine is of a single thickness and is provided with the outer inturned lip or flange 33. The brake ring 30 is adapted to function purely as a braking element and is provided with the outer encircling brake band 34 which may be applied and released by conventional means not shown. The opposite brake ring 31 is formed with two spaced walls providing an inner chamber 35 for the circulation of cooling fluid. Upon the outer surface of the hollow ring 31 is applied the brake band 36 and upon the inner surface 37 is adapted to be applied the clutch shoes 38 and 39 forming the operative parts of the internal expanding clutch assembly indicated generally by the reference numeral 40. The inner portion of this clutch arrangement is keyed to the shaft 15 and the shoes 38 and 39 are adapted to be expanded against the surface 37 by means of mechanism which includes the lever 42 which is operated by the splined clutch operator 44, having means for connection with an actuating yoke in the usual way. It will be readily seen how the clutch 40 connects the drum 10 with the shaft 15 for rotation therewith.

The heavy loads handled by such a drum and the forces transmitted to the drum by the power mechanism employed are considerable and the application of the friction shoes of the clutch causes the development of a substantial amount of heat; and of course an even greater amount of heat is generated by the application of the brake bands or shoes to the outer cylindrical surfaces of the rings as the drum is allowed to revolve when the cable unwinds. Therefore, when the drum is in constant use and is alternately employed to wind and unwind the cable in rapid succession, the amount of heat generated by the frictional contact of the clutch and braking elements becomes excessive and is likely to cause warping of the drum, the braking elements, or the friction clutches. Thus, it is found necessary to provide an effective cooling means for those parts of the drum which are thus frictionally heated.

Surrounding the shaft 15 and preferably within the confines of the brake ring 30, there is disposed the annular cup or chamber 50, the inner wall of this chamber being formed by the sealing plate 21 and an extension 51 of the flanged end plate 11 of the drum. The peripheral wall of the chamber is provided by a circumferential extension 52 of the flange 51, and the outer wall is formed by an annular plate 54 which is secured as by means of the screws 55 to provide a flange or lip on the chamber 50 which is spaced from the shaft 15 to provide an annular opening 56. A pipe 60 projects into the annular opening 56 and is adapted to supply water or other cooling fluid to the distributing chamber 50. Through the inner wall 51 of the chamber there are provided one or more openings or passageways from which one or more longitudinally extending conduits, such as that indicated at 62, lead toward the opposite end of the drum. A radial extension 63 serves to carry the fluid through the inner wall 37 of the brake and clutch ring 21 and into the cooling chamber 35. The pipe 63 projects a short distance into this chamber as at 64.

It will be readily seen that, as the distributing chamber 50 rotates with the drum, the water introduced through the pipe 60 will be held against the outer wall 52 and through the centrifugal force will pass through the pipe 62, 63 into the cooling chamber 35 and gradually fill this chamber from the outer wall to the inner wall thereof and thence through one or more outlet pipes 66 which lead from the chamber 35 back toward the opposite end of the drum. A radially directed extension or nozzle 68 is provided on the pipe 66 and serves to direct the exhaust cooling fluid from the hollow ring to the inner surface of the flanged ring 30 where a considerable volume of it is held by centrifugal force so long as the drum is rotating. Even though some steam may be generated within brake ring 30, this will occur upon the opposite side of the machine from the operator's post and will not obscure his view of the operations.

For the purpose of directing fresh cooling fluid toward the inner surface of the brake ring 30, there are provided one or more openings 70 in the inner wall 51 of the distributing chamber 50 at a point spaced inwardly from the outer wall 52 and at a higher radial level than the opening of the distributing conduit 62. Thus, after cooling chamber 35 for the brake and clutch ring 31 has been filled and circulation begun, the water will rise inwardly within the chamber 50 and eventually issue through the opening or openings 70 and provide an additional cool spray upon the inner surface of the brake ring 30.

Thus, it will be seen that a cooling system has been provided for the operating mechanism for drums of this character which will eliminate any weakening of the drive shaft by the boring of holes for cooling fluid, in which there is no interference with the use of double catheads, in which the cooling water or other fluid is introduced at a single point, and in which the safe operation of the machine is insured at a minimum of construction costs.

It is understood that various changes and modifications may be made in the embodiment illustrated and described herein without departing from the scope of the invention as defined by the following claims.

Having thus described the invention, what is claimed as new and desired to be secured by Letters Patent is:

1. In a device of the class described, in combination, a shaft, means for supporting said shaft for rotation, a winding drum mounted upon said shaft and provided with cylindrical brake rings at the respective ends thereof, a cooling system for said rings comprising a closed chamber cooling jacket adjacent one of said rings, and a spray cooling arrangement for the other of said rings, a common cooling fluid supplying means for the cooling means of both rings, and means for supplying fluid to said spray cooling arrangement for one of the rings, both directly from the common supplying means and from the cooling jacket of the other ring.

2. In a device of the class described, in combination, a shaft, means for supporting said shaft for rotation, a winding drum mounted upon said shaft and provided with cylindrical brake rings at the respective ends thereof, a cooling system for said rings comprising a closed chamber cooling jacket adjacent one of said rings, and a spray cooling arrangement for the other of said rings, and common means for supplying the cooling fluid to the cooling means of both of said brake rings, said supplying means comprising an annular fluid distributing chamber surrounding said shaft and disposed adjacent the spray cooled brake ring, means for continually supplying said chamber with cooling fluid, a passageway leading from said chamber to the cooling jacket of the other ring, and an opening in said chamber at a point radially inwardly of the periphery thereof for directing cooling fluid upon the inner surface of the spray cooled brake ring.

3. In a device of the class described, in combination, a shaft, means for supporting said shaft for rotation, a winding drum mounted upon said shaft and provided with cylindrical brake rings at the respective ends thereof, a cooling system for said rings comprising a closed chamber cooling jacket adjacent one of said rings, and a spray cooling arrangement for the other of said rings, and common means for supplying the cooling fluid to the cooling means of both of said brake rings, said supplying means comprising an annular centrifugal fluid distributing chamber surrounding said shaft, supported for rotation with said drum, and disposed within the spray cooled brake ring, means for continually supplying said chamber with cooling fluid, a passageway leading from said chamber at a point adjacent the outer periphery thereof to the cooling jacket of the other ring, and an opening in said chamber at a point radially inwardly of the periphery for directing cooling fluid upon the inner surface of the spray cooled brake ring.

4. In a device of the class described, in combination, a shaft, means for supporting said shaft, for rotation, a winding drum mounted upon said shaft and provided with cylindrical brake rings at the respective ends thereof, a cooling system for said rings comprising a closed chamber cooling jacket adjacent one of said rings, and a spray cooling arrangement for the other of said rings, and common means for supplying the cooling fluid to the cooling means of both of said brake rings, said supplying means comprising an annular centrifugal fluid distributing chamber surrounding said shaft and disposed within the spray cooled brake ring, means for continually supplying said chamber with cooling fluid, a passageway leading from said chamber to the cooling jacket of the other ring, and an opening in said chamber at a point radially inwardly of the periphery for directing cooling fluid upon the inner surface of the spray cooled brake ring, and a return conduit for leading fluid from said cooling jacket also to said spray cooled ring.

5. In a device of the class described, in combination, a solid shaft, means for supporting said shaft for rotation, a winding drum mounted upon said shaft intermediate the ends thereof, said drum being provided with cylindrical brake rings at the respective ends thereof, a cooling system for said rings comprising a closed chamber cooling jacket adjacent one of said rings, and a spray cooling arrangement for the other of said rings, and common means for supplying cooling fluid to the cooling means of both of said brake rings, said supplying means comprising an annular fluid distributing chamber surrounding said shaft and disposed adjacent the spray cooled brake ring, means for continually supplying said chamber with cooling fluid, a passageway leading from said chamber to the cooling jacket of the other ring, and an opening in said chamber at a point radially inwardly of the periphery for directing cooling fluid upon the inner surface of the spray cooled brake ring.

6. In a device of the class described, in combination, a shaft, means for supporting said shaft for rotation, a cylindrical brake ring mounted upon said shaft and having an outer friction surface for the application of a brake band, a cylindrical distributing chamber for cooling fluid carried by said drum and disposed within said brake ring, means for introducing cooling fluid into said chamber, an opening in said chamber, whereby cooling fluid may overflow and splash upon the inner surface of said brake ring.

7. In a device of the class described, in combination, a shaft, means for supporting said shaft for rotation, a cylindrical brake ring mounted upon said shaft and having an outer friction surface for the application of a brake band, the ring being provided with radially inwardly directed flanges to provide a troughed underside, a cylindrical distributing chamber for cooling fluid carried by said drum, and disposed within said brake ring, said cylindrical chamber having an annular peripheral wall and spaced side walls, means for introducing cooling fluid into said chamber through one side wall of said cylindrical chamber, an opening in the other side wall of said chamber, said opening being spaced radially inwardly from the outer peripheral wall of said chamber, whereby cooling fluid may overflow and splash upon the inner troughed surface of said brake ring.

8. In a device of the class described, in combination, a shaft, means for supporting said shaft for rotation, a cylindrical brake ring mounted upon said shaft and having an outer friction surface for the application of a brake band, a cylindrical centrifugal distributing chamber for cooling fluid carried by said drum and disposed within said brake ring, said cylindrical chamber having a cylindrical peripheral wall and spaced side walls, means for introducing cooling fluid into said chamber, an opening in said chamber, said opening being spaced radially inwardly from the outer peripheral wall of said chamber, whereby cooling fluid may overflow and splash upon the inner surface of said brake ring.

9. In a device of the class described, in combination, a shaft, means for supporting said shaft for rotation, a winding drum mounted upon said shaft and provided with cylindrical brake rings at the respective ends thereof, a cooling system for said rings comprising a closed chamber cooling jacket adjacent one of said rings, a spray cooling arrangement for the other of said rings, and means for supplying cooling fluid to the cooling means of both of said brake rings, said means for supplying cooling fluid to said closed chamber cooling jacket comprising an annular fluid distributing chamber surrounding and spaced from said shaft and rotatable with said drum, a conduit connecting said distributing chamber and said jacket, and a stationary supply conduit extending into said annular chamber through the space between said distributing chamber and said shaft.

10. In a device of the class described, in combination, a shaft, means for supporting said shaft for rotation, a winding drum mounted upon said shaft and provided with cylindrical brake rings at the respective ends thereof, a cooling system for said rings comprising a closed chamber cooling jacket adjacent one of said rings, and means for supplying cooling fluid to both of said brake rings, said last means comprising an annular fluid distributing chamber surrounding and spaced from said shaft and rotatable with said drum, a conduit connecting said distributing chamber and said jacket, an outlet conduit connecting with said jacket and extending into proximity to said other ring, and a stationary supply conduit extending into said annular chamber through the space between said distributing chamber and said shaft.

JOHN HART WILSON.